United States Patent [19]

Wetch

[11] Patent Number: 4,878,822

[45] Date of Patent: Nov. 7, 1989

[54] TIRE RECAPPING CURING JACKET

[76] Inventor: Terry L. Wetch, 704 31st St. Northwest, Fargo, N. Dak. 58012

[21] Appl. No.: 176,447

[22] Filed: Apr. 1, 1988

[51] Int. Cl.$^4$ ................. B29C 35/02; B29C 37/00
[52] U.S. Cl. .................. 425/14; 156/381; 425/28.1; 425/32
[58] Field of Search .......... 425/19, 32, 28.1, 45, 425/DIG. 19, 14; 156/96, 382, 381, 394.1; 220/3, 378

[56] References Cited

U.S. PATENT DOCUMENTS

| | | | |
|---|---|---|---|
| 2,966,936 | 1/1961 | Schelkmann | 154/14 |
| 3,207,647 | 9/1965 | Schelkmann | 156/394 |
| 3,730,801 | 5/1973 | Martin | 156/96 |
| 3,745,084 | 7/1973 | Schelkmann | 159/394 |
| 3,752,726 | 8/1973 | Barefoot | 425/19 |
| 3,793,116 | 2/1974 | Schelkmann | 156/394 |
| 3,802,978 | 4/1974 | Barnett | 156/96 |
| 3,837,385 | 9/1975 | Schelkmann | 156/382 |
| 3,884,740 | 5/1975 | Schelkmann | 156/96 |
| 4,129,474 | 12/1978 | Martin | 156/96 |
| 4,151,027 | 4/1979 | Schelkmann et al. | 156/382 |

FOREIGN PATENT DOCUMENTS 62699   11/1959   Netherlands ............. 156/96

*Primary Examiner*—Willard Hoag
*Attorney, Agent, or Firm*—Kinney & Lange

[57] ABSTRACT

A curing jacket for use in conjunction with a tire to be recapped having a pair of sidewalls and a tread. The curing jacket includes a unitary tubular envelope having first and second edges. The curing jacket is sized to encase the tire by extending around a circumference of and adjacent to interior and exterior surfaces of the sidewalls and tread of the tire. An O-ring on the first edge of the tubular envelope fits within a seat on the second edge to provide an airtight seal. Air is evacuated from the envelope through a valve. The jacketed tire is cured in a curing oven.

7 Claims, 4 Drawing Sheets

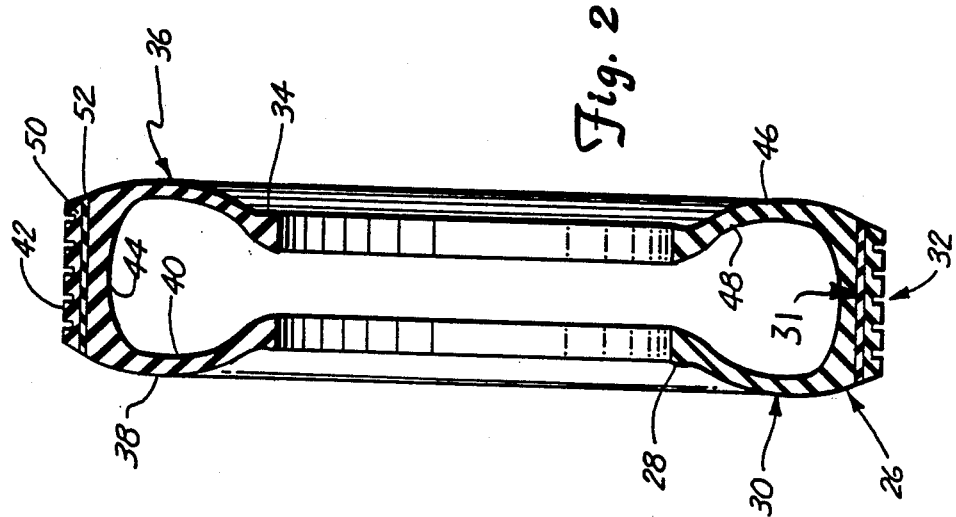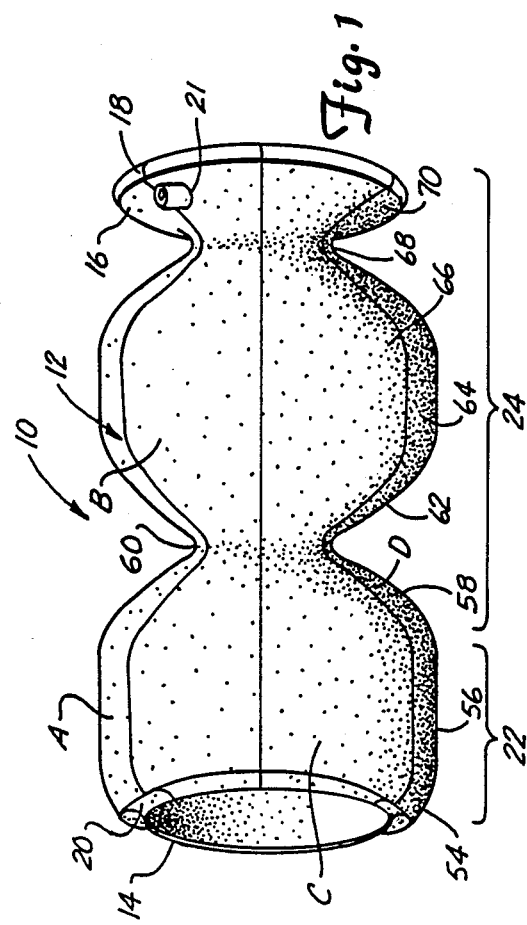

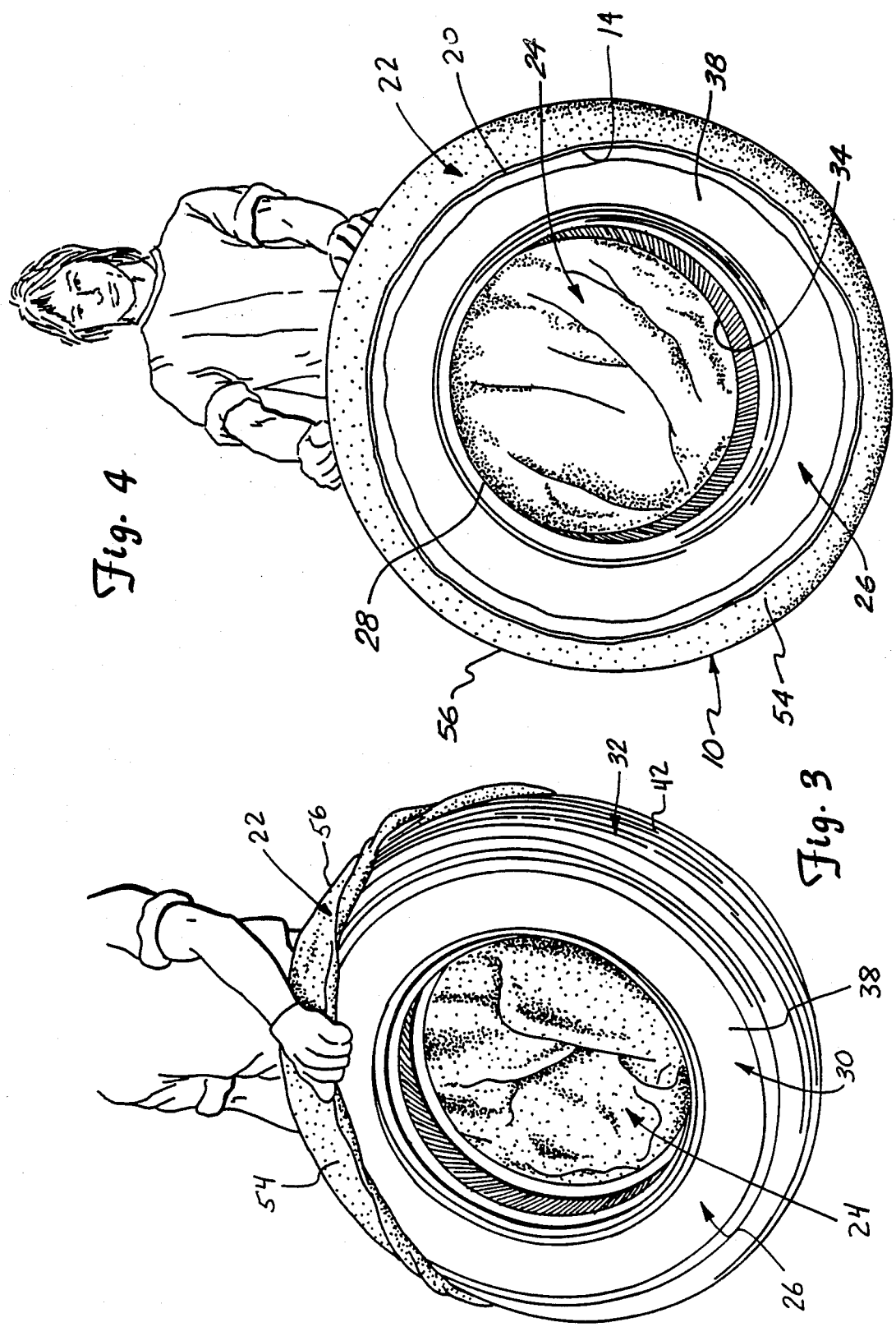

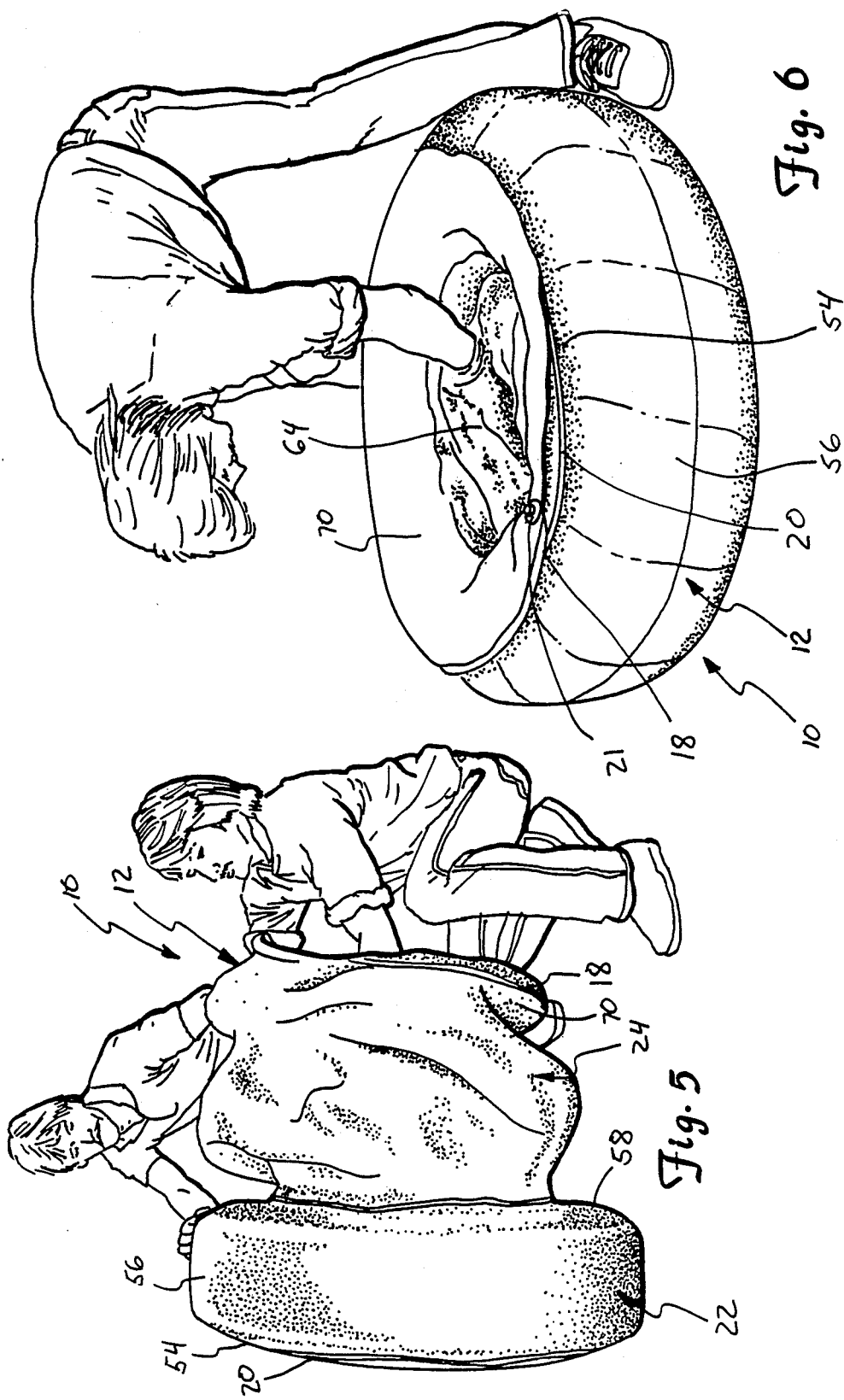

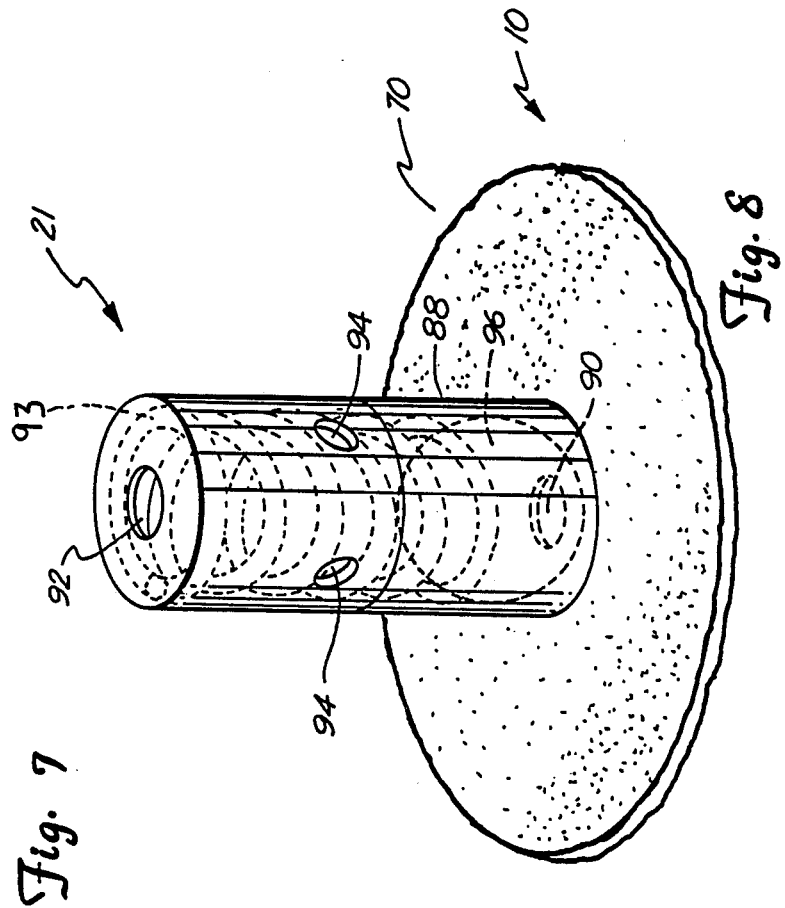
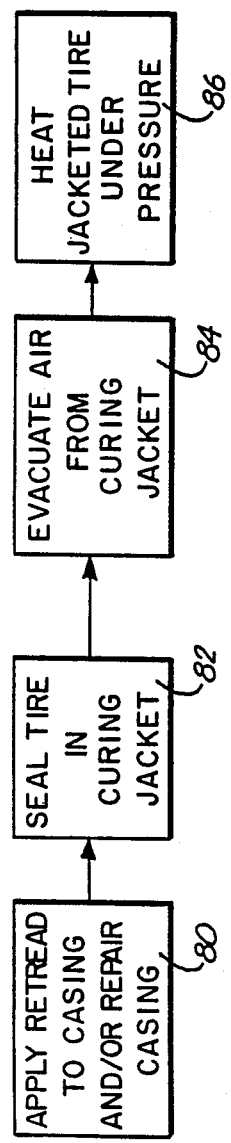

TIRE RECAPPING CURING JACKET

BACKGROUND OF THE INVENTION

1. Field of the Invention

The present invention relates generally to a method and apparatus for recapping or retreading tires.

2. Description of the Prior Art

Worn tires are generally recapped using one of several known techniques. Typically, the tread or outer circumference of the worn tire casing must first be buffed down. If hot cure methods are being used, the buffed tire casing and new tread rubber are placed in a mold, and the new tread molded onto the casing.

Precure or cold cure techniques are more commonly used since they produce a longer wearing retreaded tire. Following these methods a strip of retread rubber or material is cut from a roll and mounted to the outer surface of the buffed tire casing by an adhesive and cushion gum. An envelope formed by an innertube, flap and metal rim is then mounted to the tire. The innertube is positioned about the interior circumference of the tire, while the flap is draped over the exterior circumference. The flap and innertube are sealed together on opposite sides of the tire near the beads by the rim, to form an airtight envelope surrounding the tire. The innertube is then inflated, and the tire positioned in a curing oven. Air is evacuated from the flap through a valve coupled to a vacuum pump by a hose. The tire is then cured in the oven by heating it under pressure.

Cold cure techniques involving an envelope formed by a rim, innertube, and flap are difficult and time consuming to implement. The rims are heavy, and a number of different sizes are needed to correspond to the size of a tire being retreaded. The flaps and innertubes often fatigue and fail, further adding to the expenses involved in this method.

It is evident that there is a continuing need for improved procedures for recapping tires. An apparatus and method which reduce the expense and difficulty associated with the envelope currently used with cold cure techniques is desired.

SUMMARY OF THE INVENTION

The present invention is a curing jacket for use in conjunction with a tire to be recapped which has a pair of sidewalls and a tread. The jacket includes a tubular envelope having first and second edges. The envelope is adapted to extend around a circumference of and adjacent to interior and exterior surfaces of the sidewalls and tread of the tire. An airtight seal between the first and second edges of the envelope is provided by airtight seal means. Evacuation means permit air to be evacuated from the sealed envelope. A tire encased in the curing jacket can be easily positioned in an oven and cured.

In preferred embodiments the tubular envelope of the curing jacket is formed from resilient rubber material and includes a skirt section and an extended section. The skirt section includes the first edge of the envelope and is sized to extend around the exterior surface of the tread and the exterior surface of only an outer portion of the first sidewall. The extended section extends from the skirt section and includes the second edge of the envelope. The extended section is sized to extend around the interior and exterior surfaces of the second sidewall, interior surface of the tread, interior surface of the first sidewall, and the exterior surface of the inner portion of the first sidewall. The airtight seal means includes complementary members of an 0-ring seal which are mounted to the first and second edges of the envelope. A valve can be used for the evacuation means.

Tires can be quickly and relatively easily retreaded using the curing jacket and method of the present invention. Time-consuming prior art procedures required to mount the envelope need no longer be performed. Costs associated with failure and fatigue of the tube and flap will be eliminated. Tires being recapped are also easier to work with since the heavy rim is no longer required. Recapping production can therefore be increased, while costs will decrease.

BRIEF DESCRIPTION OF THE DRAWINGS

FIG. 1 is a view illustrating a curing jacket in accordance with the present invention.

FIG. 2 is a sectional view of a tire which can be recapped in accordance with the present invention using the curing jacket shown in FIG. 1.

FIG. 3 is a view illustrating the positioning of a skirt section of the jacket on the tire.

FIG. 4 is a view illustrating the tire after the skirt section has been positioned thereon.

FIG. 5 is a view of the tire as the extended section is being draped thereover.

FIG. 6 is a view illustrating the tire encased in the jacket.

FIG. 7 is a view illustrating the method by which tires are recapped using the jacket shown in FIG. 1.

FIG. 8 is a detailed illustration of the valve shown in FIG. 1.

DETAILED DESCRIPTION OF THE PREFERRED EMBODIMENTS

A curing jacket 10 in accordance with the present invention is illustrated generally in FIG. 1. As shown, curing jacket 10 includes a tubular envelope 12 having opposite edges 14 and 16, an airtight seal mechanism formed by 0-ring 18 and C-shaped seat 20, and an air evacuation valve 21. Envelope 12 is shaped to correspond to the contour of interior and exterior surfaces of a tire 26 (FIG. 2) and includes a skirt section 22 and an extended section 24.

Jacket 10 is sized to encase a tire being recapped, such as that illustrated at 26 in FIG. 2. Tire 26 includes first bead 28, first sidewall 30, tread 32, second bead 34 and second sidewall 36. Sidewall 30 has an exterior surface 38 and an interior surface 40. Tread 32 includes a casing wall 31 and has an exterior surface 42 and an interior surface 44. Sidewall 36 has an exterior surface 46 and an interior surface 48. In the embodiment shown, tire 26 has been prepared for recapping using standard precure or cold cure techniques. Casing wall 31 is buffed, and a strip 50 of tread rubber is applied thereto by means of a curing agent layer 52 of adhesive and/or cushion gum. These recapping procedures are well known and in widespread use.

Referring back to FIG. 1, it can be seen that various portions of skirt section 22 and extended section 24 of envelope 12 are contoured to conform to the shape of tire 26. Skirt section 22 includes an outer exterior first sidewall portion 54 and an exterior tread portion 56. Extended section 24 of envelope 12 includes an exterior second sidewall portion 5B, second bead portion 60, interior second sidewall portion 62, interior tread portion 64, interior first sidewall portion 66, first bead portion 68, and inner exterior first sidewall portion 70. Edge 14, which is adjacent outer exterior first sidewall portion 54, has a diameter which is greater than a rim diameter of tire 26 (i.e. the diameter at bead 28) to facilitate the positioning of jacket 10 on the tire. In one embodiment, edge 14 has a diameter of approximately seven-eights the diameter of tire 26 at tread 32. Exterior tread portion 56 has a diameter equal to the diameter of tread 32, and a width which is equal to the width of the tread. The diameter of exterior first sidewall portion 54 extends from the diameter of edge 14 to the diameter of exterior tread portion 56.

The diameter of envelope 12 at second bead portion 60 is equal to the diameter of tire 26 at second bead 34. The diameter of portion 5B varies and extends between that of bead portion 60 and tread portion 56. Interior tread portion 64 has a diameter and width which correspond to the diameter and width of interior surface 44 of tire tread 32. The diameters of interior sidewall portions 62 and 66 vary between the diameters of bead portions 60 and 6S, respectively, and interior tread portion 64. Edge 16 of envelope 12 has a diameter substantially equal to that of edge 14. The diameter of inner exterior first sidewall portion 70 extends from that of edge 16 to the diameter of bead portion 68. The exact dimensions of envelope 12 will depend upon the size of the tire for which it is made to be used.

Envelope 12 is assembled from a plurality of different sections of material (sections A-D are shown in FIG. 1). Envelope 12 is a unitary element in the embodiment shown, in the sense that it is one integral piece following its manufacture. Resilient or stretchable materials such as synthetic rubbers ca be used to manufacture envelope 12. The durability and life of jacket 10 can be enhanced if the rubber is relatively thick.

The sequence of steps by which jacket 10 is applied to tire 26 which is being recapped is illustrated with reference to FIGS. 3-6. As shown in FIG. 3, skirt section 22 is first stretched over tread 32 and sidewall 30 of tire 26. Outer exterior sidewall portion 54 will overlie and extend around the circumference of the outer edge of exterior sidewall surface 38, while exterior tread portion 56 will overlie and extend around exterior tread surface 42. FIG. 4 illustrates tire 26 after skirt section 22 has been stretched thereon. As shown, edge 14 of jacket 10 has its diameter cut in such a manner that it extends only a short distance onto sidewall 30 from tread 32. This facilitates the ease by which jacket 10 can be mounted to tire 26.

After skirt section 22 of jacket 10 has been positioned on tire 26, extended section 24 is draped over second sidewall 36, inside the tire through the opening defined by bead 34, and out the tire through the opening defined by bead 2B. Envelope 12 is then positioned such that sidewall portion 58 overlies and extends around the circumference of exterior sidewall surface 46. Envelope 12 is then tucked into tire 26 in such a manner tat portions 62, 64 and 66 of extended section 24 overlie and extend around the circumference of interior surfaces 48, 44 and 40, respectively, of the tire. Bead portion 68 will fit adjacent bead 28. Inner exterior sidewall portion 70 will overlie and extend around the circumference of the portions of exterior sidewall surface 38 not covered by portion 54. Edge 16 of envelope 12 is then sealed with edge 14 by inserting 0-ring 18 into seat member 20. Tire 26 is thereby encased within airtight jacket 10. This sequence of steps is illustrated in FIGS. 5 and 6.

The method by which a tire such as 26 is recapped using jacket 10 is described with reference to FIG. 7. Retread material 50 is first applied to casing wall 31. Typically, this is done by applying a layer 52 of adhesive and curing gum as described above. Bead repairs, patches, spot/liner repairs and any other areas of tire 26 which need to be repaired with cushion gum can also be repaired at this time. This step is illustrated at SO in FIG. 7. As shown at step 82, tire 26 is then encased or sealed within jacket 10 in the manner described above. Air is then evacuated from jacket 10 through valve 21 (step 84). Finally, the tire is positioned in an oven and cured by heating it under pressure. This step is illustrated at 86. Jacketed tire 26 can be cured in commercially available ovens at temperatures and pressures which are well known in the art.

After tire 26 has been encased within jacket 10, air can be evacuated therefrom through valve 21 by means of a vacuum pump in a well known manner. Alternatively, jacket 10 can be "self-evacuated" when pressurized within the curing oven with a valve 21 such as that shown in FIG. 8. Valve 21 includes a cylindrical valve stem 88 which is mounted to sidewall section 70 of jacket 10. Valve stem 88 has a hole 90 on one end thereof which communicates with the interior of jacket 10 when positioned on tire 26, and a hole 92 on the opposite end. A plurality of holes 94 are positioned about the circumference of valve stem 8S midway between holes 90 and 92. Seal ball 96 is positioned within valve stem 88 and is biased toward hole 90 by spring 93. When tire 26 is encased within jacket 10 and positioned in a pressurized curing oven, ball 96 will be forced out of its seated position within hole 90 allowing the oven pressure to force air out of the jacket through holes 94. When all of the air is released and the jacket is airtight, ball 96 will be forced into its seated position within hole 90, blocking the hole and forming an airtight seal.

Use of the tire curing jacket and method described above to recap tires has considerable advantages over those of the prior art. Tires can be retreaded much faster since the time consuming procedures for mounting the tube, flap and rim are no longer needed. Costs associated with failure and fatigue of the tube and flap can be eliminated. Since the envelope has a short skirt, it can be easily stretched over the outside circumference of the tire. Tires being recapped are also easier to work with since the heavy rim is no longer required. Recapping production can therefore be increased, while costs will decrease.

Although the present invention has been described with reference to the preferred embodiments, those skilled in the art will realize that changes may be made in form and detail without departing from the spirit and scope of the invention.

What is claimed is:

1. For use in conjunction with a tire to be recapped and having a pair of sidewalls and a tread, a curing jacket for encasing the tire, including:

a tubular envelope having first and second edges and configured to extend around a circumference of and adjacent to interior and exterior surfaces of the sidewalls and tread of the tire;

an O-ring member on the first edge of the envelope;

a complementary seat member for joining with the O-ring member, on the second edge of the envelope; and evacuation means for permitting air to be evacuated from the sealed envelope.

2. The curing jacket of claim 1 wherein the tubular envelope is a unitary envelope.

3. The curing jacket of claim 2 wherein the tubular envelope includes several sections of material extending in a longitudinal direction between the first and second edges.

4. The curing jacket of claim 1 wherein the tubular envelope is formed of resilient material.

5. The curing jacket of claim 4 wherein the envelope is formed from rubber material.

6. The curing jacket of claim 1 wherein the tubular envelope includes:

a skirt section including the first edge of the envelope, the skirt section sized to extend around the exterior of the tread and around only an outer portion of the first sidewall; and an extended section extending from the skirt section and including the second edge of the envelope, the extended section sized to extend around the interior and exterior surfaces of the second sidewall, the interior surface of the tread, the interior surface of the first sidewall, and the exterior surface of the inner portion of the first sidewall.

7. The curing jacket of claim 1 wherein the evacuation means include a valve mounted on the envelope.

* * * * *